(12) United States Patent
Sathian et al.

(10) Patent No.: US 8,703,044 B2
(45) Date of Patent: Apr. 22, 2014

(54) MACHINE COMPONENTS AND METHODS OF FABRICATING AND REPAIRING (75) Inventors: Sujith Sathian, Greer, SC (US); Anjilivelil K. Kuruvilla, Greer, SC (US); Daniel Nowak, Greenville, SC (US)

(73) Assignee: General Electric Company, Schenectady, NY (US)

( * ) Notice: Subject to any disclaimer, the term of this patent is extended or adjusted under 35 U.S.C. 154(b) by 667 days.

(21) Appl. No.: 11/324,445

(22) Filed: Jan. 3, 2006

(65) Prior Publication Data

US 2007/0154338 A1    Jul. 5, 2007

(51) Int. Cl.
*B22F 7/00* (2006.01)
*B23K 1/00* (2006.01)
*B23P 6/00* (2006.01)
*F01D 5/00* (2006.01)
*F01D 5/22* (2006.01)

(52) U.S. Cl.
CPC ............... *B23K 1/0018* (2013.01); *B23P 6/005* (2013.01); *F01D 5/005* (2013.01); *F01D 5/225* (2013.01); *B23K 2201/001* (2013.01); *F05D 2230/22* (2013.01)
USPC ...... 419/5; 419/29; 419/44; 419/53; 428/668; 415/170.1; 416/241 R; 416/241 B (58) Field of Classification Search
CPC  B23K 1/0018; B23K 2201/001; B23P 6/005; F01D 5/005; F01D 5/225; F02D 2230/22
USPC ....................................................... 419/9, 5
See application file for complete search history.

(56) References Cited

U.S. PATENT DOCUMENTS

| 4,005,988 | A | * | 2/1977 | Paulonis et al. ............... 428/652 |
| 4,155,152 | A | | 5/1979 | Cretella et al. |
| 4,291,448 | A | | 9/1981 | Cretella et al. |
| 4,614,296 | A | | 9/1986 | Lesgourgues |
| 4,822,248 | A | | 4/1989 | Wertz et al. |

(Continued)

FOREIGN PATENT DOCUMENTS

| EP | 1 559 868 A2 | 8/2005 |
| JP | 2000266055 | 9/2000 |
| JP | 2001081502 | 3/2001 |
| WO | WO 2005/045198 A2 | 5/2005 |

OTHER PUBLICATIONS

Mel M. Schwartz, Brazing, 2nd ed., ASM International, 2003, p. 305.*

(Continued)

*Primary Examiner* — Roy King
*Assistant Examiner* — Christopher Kessler
(74) *Attorney, Agent, or Firm* — Armstrong Teasdale LLP (57) ABSTRACT A method of fabricating a machine component is provided. The method includes preparing at least a portion of a surface of a machine component for receiving a sintered preform. The method also includes forming a pre-sintered preform hybrid hardface mixture that includes combining a predetermined portion of at least one hardfacing material with a predetermined portion of at least one brazing material. The method further includes forming a pre-sintered preform. The pre-sintered preform has predetermined dimensions. The method also includes forming the sintered preform and positioning the sintered preform on the machine component. The method further includes fixedly coupling the sintered preform to at least a portion of the machine component via brazing.

11 Claims, 4 Drawing Sheets

(56) References Cited

U.S. PATENT DOCUMENTS

| | | |
|---|---|---|
| 5,476,723 A | 12/1995 | Pagnon |
| 6,164,916 A | 12/2000 | Frost et al. |
| 6,233,822 B1 | 5/2001 | Grossklaus, Jr. et al. |
| 6,451,454 B1 * | 9/2002 | Hasz et al. ............... 428/668 |
| 6,726,086 B2 * | 4/2004 | Philip ....................... 228/195 |
| 7,335,427 B2 * | 2/2008 | Sathian .................... 428/668 |
| 2005/0091848 A1 | 5/2005 | Nenov et al. |
| 2005/0166397 A1 | 8/2005 | Ng |

OTHER PUBLICATIONS

B. Lynn Ferguson and Randall M. German, Powder Shaping and Consolidation Processes, ASM Handbook, vol. 7, pp. 313-320, 1998.*

* cited by examiner

MACHINE COMPONENTS AND METHODS OF FABRICATING AND REPAIRING

BACKGROUND OF THE INVENTION

This invention relates generally to fabricating machine components and more particularly, to methods and apparatus for forming a hardfacing layer on a machine component.

Most known turbine blades are coupled to a central hub that is attached to a driven shaft and the blades are substantially radially disposed with respect to the axis of the hub and shaft. The blades include an airfoil and a high energy, driving fluid impacts the airfoils and imparts a rotational energy that in turn rotates the shaft. Some known combustion turbine blades have shrouds at the outer extremities of the associated airfoils. The blade shrouds are nested in close proximity to each other. Many known turbine blade shrouds have a mechanical interlocking feature in the form of a notch, often referred to a "Z-notch" due to its shape closely resembling the letter Z, that allows each blade to be physically interlocked at its shroud with an adjacent blade.

There are a variety of mechanisms that may cause wear in the region of the Z-notches. For example, during operation of the engine there may be minute, but continuous, vibration of adjacent blades with respect to each other and the hub. The aforementioned interlocking feature facilitates mitigation of airfoil vibration such that the stresses induced within the blades during operation are in turn mitigated. Since the vibration in the blades is mitigated by the close tolerances of the shroud's Z-notches, this condition may increase wear in the vicinity of the shroud's Z-notches as the adjacent notches rub against each other.

Further, during engine starting operations, as the temperatures of the shrouds, airfoils, and hub (as well as all other components that interface with the fluid) vary within each individual component and with respect to other adjacent components, and the engine is accelerated to an operating speed, the blades and shrouds will twist such that the notches will at times contact each other, i.e., attain an interlocked condition. Also, during engine stopping operations there will be a variation in component temperatures substantially reversed from the variations associated with startup as well as an engine deceleration such that the blades and shrouds will twist so that the notches will not contact each other, i.e., attain a non-interlocked condition.

In general, shroud materials do not have the hardness characteristics to withstand the long-term cumulative effects of contact and rubbing. The surface materials of the notches tend to wear. As the notches wear, the effects of the aforementioned twisting and vibration will increase and maintenance shutdowns and repairs may be more frequent. Therefore, a protective material that is compatible with the substrate material and has an increased hardness characteristic, as compared to the substrate materials, to facilitate a decrease in the susceptibility of the notch regions to wear typically is utilized with the Z-notches. This process is often referred to as hardfacing and the associated materials used are referred to as hardfacing materials. The hardface material layers can be formed by welding, spraying or brazing. In general, spray methods may not offer the long-term results achieved by some welding and brazing methods.

Hardfacing using fusion welding methods, including tungsten inert gas (TIG), laser and plasma arc welding methods, have a potential to introduce variables into the hardfacing process that mitigates against repeatability of defect-free layer formation. This situation tends to increase the number and the length of post-weld inspections and weld remediation activities. For example, welding defects typically include weld cracking, porous hardface layers, poor hardface bonding and adhesion, oxidizing of the hardface material and the substrate, and cracking of the substrate due to the creation of a heat affected zone.

BRIEF DESCRIPTION OF THE INVENTION

In one aspect, a method of fabricating a machine component is provided. The method includes preparing at least a portion of a surface of a machine component for receiving a sintered preform. The method also includes forming a pre-sintered preform hybrid hardface mixture that includes combining a predetermined portion of at least one hardfacing material with a predetermined portion of at least one brazing material. The method further includes forming a pre-sintered preform. The pre-sintered preform has predetermined dimensions. The method also includes forming the sintered preform and positioning the sintered preform on the machine component. The method further includes fixedly coupling the sintered preform to at least a portion of the machine component via brazing.

In another aspect, a method of repairing a machine component is provided. The method includes preparing at least a portion of a machine component to be repaired. The machine component has a substrate, the substrate has a surface, and at least a portion of the substrate surface has a predetermined material composition. Preparing the component includes removing sub-surface material deformations, filling surface voids by forming a layer of a material compatible with the substrate material on the surface and mitigating surface irregularities by machining the surface to predetermined dimensions. The method also includes forming a pre-sintered preform hybrid hardface mixture by combining a predetermined portion of at least one hardfacing material with a predetermined portion of at least one brazing material. The method further includes forming a pre-sintered preform, the pre-sintered preform having predetermined dimensions. The method also includes forming the sintered preform and positioning the sintered preform on the machine component. The method also includes fixedly coupling the sintered preform to at least a portion of the machine component via brazing.

In a further aspect, a machine component is provided. The component includes a substrate. The substrate includes a surface and at least a portion of the substrate surface includes a predetermined material composition. The machine component also includes a hybrid hardface material layer. The hybrid hardface material layer is formed over at least a portion of the substrate surface via brazing a sintered preform to the substrate surface. The sintered preform includes a mixture of braze and hardface materials.

DETAILED DESCRIPTION OF THE INVENTION

Figure 1:
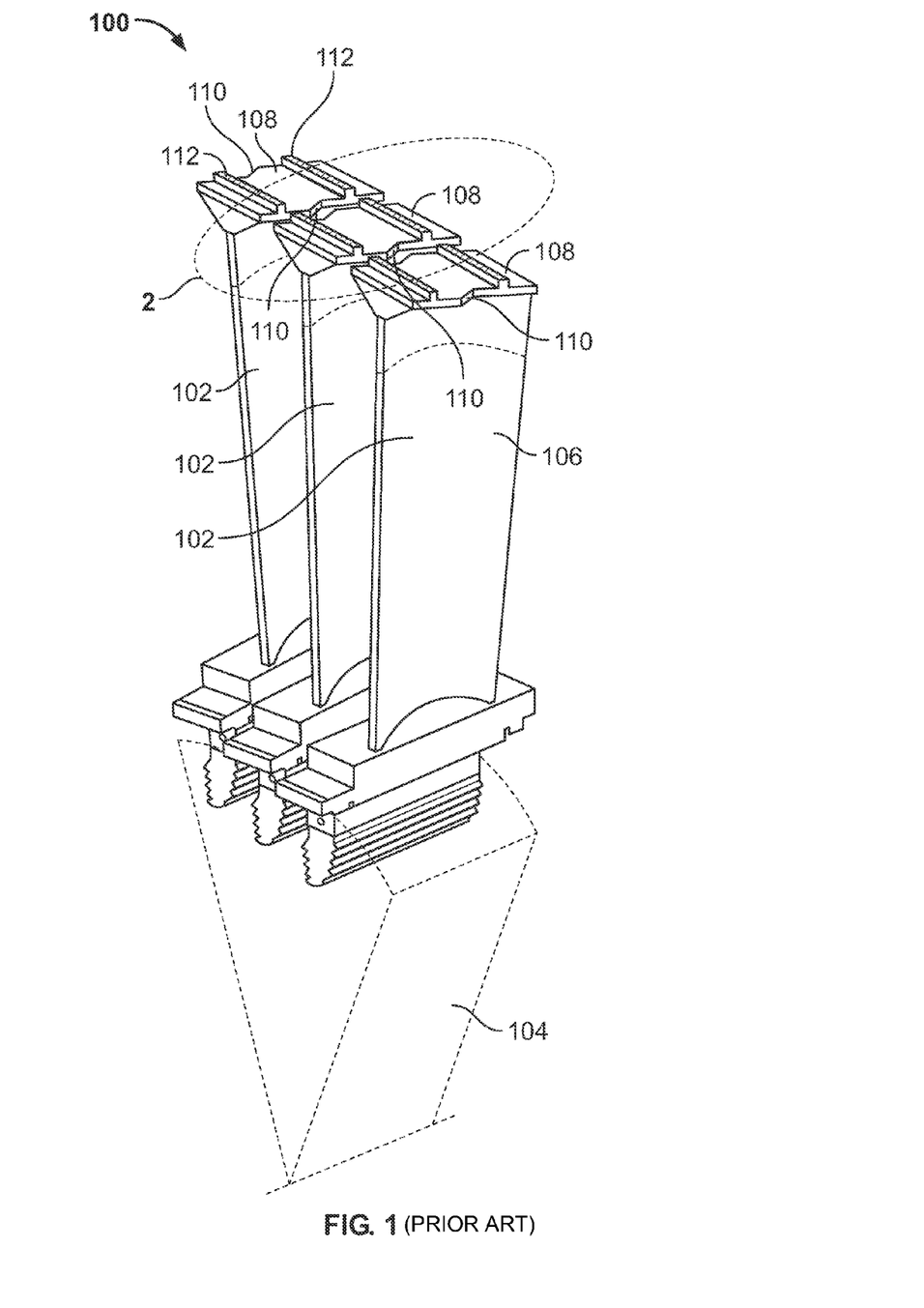
FIG. 1 is a side perspective view of a section of an exemplary combustion turbine engine.

FIG. 1 is a side perspective view of a section of an exemplary combustion turbine engine 100. Engine 100 has a plurality of turbine blades 102 coupled to a hub 104. In the exemplary embodiment, blades 102 are third stage buckets. Hub 104 is coupled to a turbine shaft (not shown in FIG. 1). Each of blades 102 have a corresponding airfoil 106 and a corresponding turbine blade shroud 108 fixedly coupled to airfoil 106 at the radially outermost extremity of airfoil 106. Each shroud 108 has two correspondingly opposite Z-notches 110 with only one for each shroud 108 illustrated. Protrusions 112 facilitate coupling a substantially arcuate seal ring (not shown in FIG. 1) to shrouds 112 to facilitate mitigation of blade 102 circumferential movement and vibration. The portion of FIG. 1 enclosed by the bold dotted line and labeled 2 is illustrated in FIG. 2.

In one embodiment, engine 100 is a MS9001FA engine, sometimes referred to as a 9FA engine, commercially available from General Electric Company, Greenville, S.C. The present invention is not limited to any one particular engine and may be implanted in connection with other engines including, for example, the MS6001FA (6FA), MS6001B (6B), MS6001C (6C), MS7001FA (7FA), MS7001FB (7FB), and MS9001FB (9FB) engine models of General Electric Company.

Figure 2:
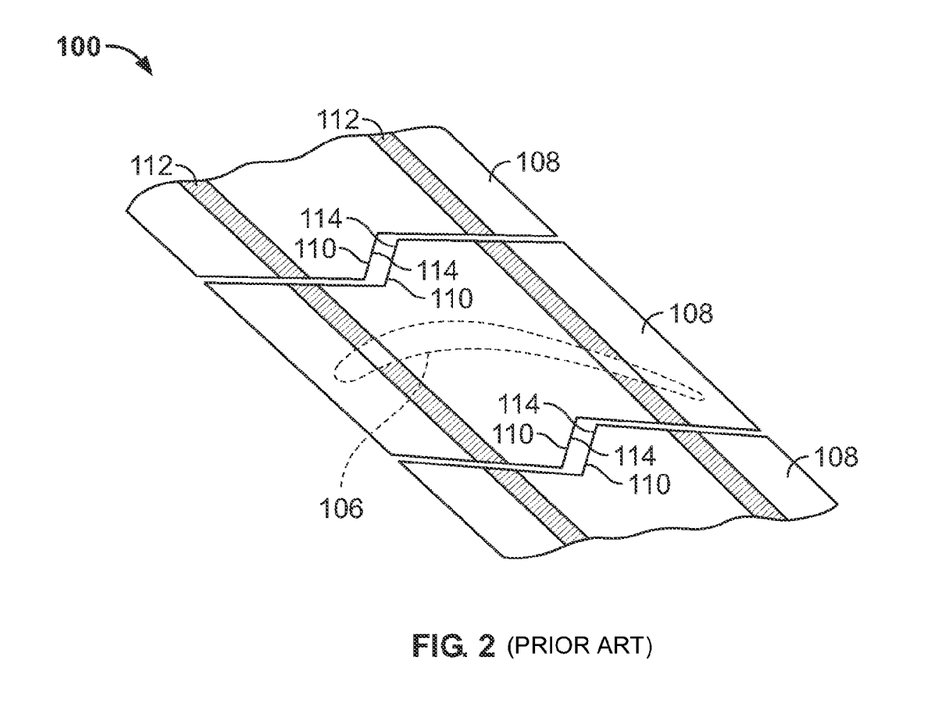
FIG. 2 is a fragmentary overhead perspective view of a plurality of turbine blade shrouds without hardfacing that may be used with the combustion turbine engine in FIG. 1.

FIG. 2 is a fragmentary overhead perspective view of turbine blade shrouds 108 without hardfacing that may be used with combustion turbine engine 100. Shrouds 108 are illustrated with Z-notches 110 on each end. Z-notches 110 have a mating surface 114. Airfoil 106 (in outline) and protrusions 112 are illustrated to provide perspective on the orientation.

Shrouds 108 have a substrate that may be formed of a superalloy material. The superalloy is typically a nickel-based or a cobalt-based alloy, wherein the amount of nickel or cobalt in the superalloy is the single greatest element by weight. Illustrative nickel-based superalloys include at least approximately 40 weight percent nickel (Ni), and at least one component from the group consisting of cobalt (Co), chromium (Cr), aluminum (Al), tungsten (W), molybdenum (Mo), titanium (Ti), tantalum (Ta), Niobium (Nb), hafnium (Hf), boron (B), carbon (C), and iron (Fe). Examples of nickel-based superalloys may be designated by, but not be limited to the trade names Inconel®, Nimonic®, Rene® (e.g., Rene®80-, Rene®95, Rene®142, and Rene®N5 alloys), and Udimet®, and include directionally solidified and single crystal superalloys. Illustrative cobalt-base superalloys include at least about 30 weight percent Co, and at least one component from the group consisting of nickel, chromium, aluminum, tungsten, molybdenum, titanium, and iron. Examples of cobalt-based superalloys are designated by the trade names Haynes®, Nozzaloy®, Stellite® and Ultimet®.

Figure 3:
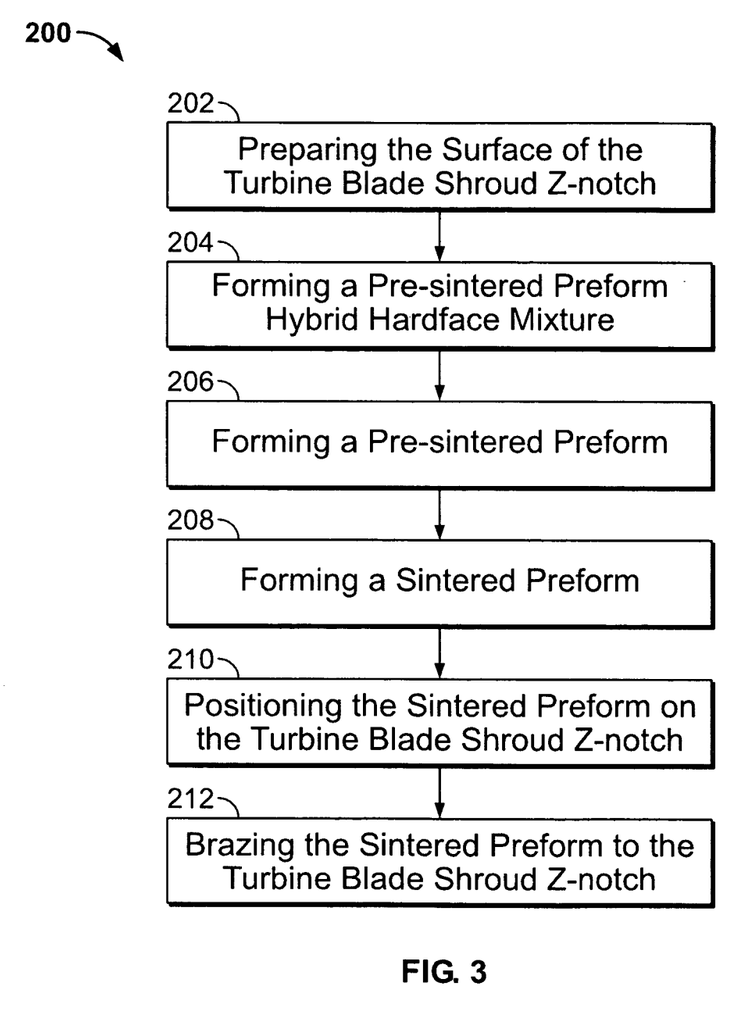
FIG. 3 is a flow chart of an exemplary method for hardfacing the turbine blade shrouds in FIG. 2.

FIG. 3 is a flow chart of an exemplary method 200 for hardfacing turbine blade shrouds 108, and more specifically, the associated Z-notches 110 (shown in FIG. 2). Method step 202 of exemplary method 200 is preparing surface 114 (shown in FIG. 2) of turbine blade shroud Z-notch 110. Step 202, as performed on a shroud 108 that has never been placed into service within engine 100, includes a sub-step for removing any loose surface contaminants that may have collected during service. These surface contaminates may include loose dust and grit deposited during storage. Step 202 also has a sub-step for removing applied coating materials. During the fabrication process, any coatings applied to blade 102 (shown in FIG. 1) may have also deposited on surface 114. Generally, subsequent steps of method 200 that include material bonding processes may be negatively impacted by the presence of turbine blade coatings. Also, step 202 includes a sub-step for removal of metallurgical impurities from Z-notch mating surface 114, for example, oxidized surface layers, that may have been formed during blade 102 fabrication and storage. Furthermore, step 202 has a sub-step for removing surface irregularities typically formed during the fabrication process. Generally, the methods for preparing the surface as described above use mild detergents, mild abrasives, and light machining.

Alternatively, method step 202 may be performed on a shroud 108 that has seen service within engine 100, has been removed for inspection and is scheduled to undergo repair. Prior to performing step 202, it is assumed that shrouds 108 have been removed from engine section 100 using disassembly practices well known in the art. Shroud 108 may be separated from airfoil 106 to facilitate performing further method steps associated with shrouds 108. Alternatively, shrouds 108 may remain coupled to airfoil 106 to facilitate combining a variety of maintenance activities associated with blade 102. Prior to performing the sub-steps as described above, shroud 108 may need additional preparatory sub-steps. While placed in-service, shrouds 108 experience a variety of environmental conditions that may alter the substrate material condition, for example, small cracks may develop due to temperature gradients induced during operational transients. These additional sub-steps include removing sub-surface material deformations. For removing deformations that are nearer the surface, grinding the machine component substrate surface to form a mating surface using a mild abrasive may be more advantageous. For those deformations that are deeper from the surface, grinding at least a portion of the machine component substrate surface using a pneumatically- or electrically-powered grinder may be more advantageous. An additional sub-step is filling surface voids formed by the grinding activities described above or nominal pitting formed during in-service operation as a result of physical interaction with the high energy fluid and any potentially entrained particulate contaminants. Filling the voids is typically performed by forming a layer of a material compatible with the substrate material on Z-notch mating surface 114. Furthermore, an additional sub-step is mitigating surface irregularities by machining the surface to predetermined dimensions. This sub-step is normally performed with light machining using mild abrasives.

Method step 204 of exemplary method 200 is forming a pre-sintered preform (PSP) hybrid hardface mixture. Step 204 includes combining a predetermined portion of at least one hardfacing material with a predetermined portion of at least one brazing material to form a hybrid hardface material. In the exemplary embodiment, the hardface material is Tribaloy T800 in powdered form. T800 is a cobalt-based hardface alloy produced by Deloro Stellite Inc., Belleville, Ontario, Canada and is commercially available from WESGO Ceramics, a division of Morgan Advanced Ceramics, Haywood, Calif. T800 has the following constituents by their approximate weight in %:

| | |
|---|---|
| Co | Balance |
| Mo | 27.00-30.00 |
| Cr | 16.50-18.50 |
| Si | 3.00-3.80 |

-continued

| | |
|---|---|
| Fe | 1.50 Maximum |
| Ni | 1.50 Maximum |
| O | 0.15 Maximum |
| C | 0.08 Maximum |
| P | 0.03 Maximum |
| S | 0.03 Maximum |

The chromium content of the T800 powder facilitates a mitigation of oxidation and corrosion.

Alternatively, Coast Metal 64, sometimes referred to as CM-64 and CM64, may be used. CM-64 is commercially available from WESGO Ceramics, a division of Morgan Advanced Ceramics, Haywood, Calif. CM-64 has the following constituents by their approximate weight in %:

| | |
|---|---|
| Co | Balance |
| Cr | 26.00-30.00 |
| W | 18.00-21.00 |
| Ni | 4.00-6.00 |
| V | 0.75-1.25 |
| C | 0.70-1.00 |
| B | 0.005-0.10 |
| Fe | 3.00 Maximum |
| Mg | 1.00 Maximum |
| Si | 1.00 Maximum |
| Mo | 0.50 Maximum |

In the exemplary embodiment, the brazing material is MAR M-509B in powdered form. M-509B is commercially available from WESGO Ceramics, a division of Morgan Advanced Ceramics, Haywood, Calif. M-509B is a cobalt-based braze alloy with a boron additive and has the following constituents by their approximate weight in %:

| | |
|---|---|
| Co | Balance |
| Cr | 22.00-24.75 |
| Ni | 9.00-11.00 |
| W | 6.50-7.60 |
| Ta | 3.00-4.00 |
| B | 2.60-3.16 |
| C | 0.55-0.65 |
| Zr | 0.30-0.60 |
| Ti | 0.15-0.30 |
| Fe | 1.30 Maximum |
| Si | 0.40 Maximum |
| Mn | 0.10 Maximum |
| S | 0.02 Maximum |

The significance of the aforementioned boron additive is described below.

In the exemplary embodiment the ratio of T-800/CM-64 to MAR-M-509B is 80%-85% T-800/CM-64 to 20%-15% MAR-M-509B. Alternatively, ratios of T-800/CM-64 to MAR-M-509B of 90%-60% T-800/CM-64 to 10%-40% MAR-M-509B may be used. As the percentage of MAR-M-509B is increased the brazing temperature and wear resistance properties of the compound tend to decrease.

Method step 206 of exemplary method 200 is forming a pre-sintered preform. Step 206 includes forming the PSP hybrid hardface mixture in a shape substantially similar to a flat plate with a predetermined thickness. Typically, the thickness is predetermined based on the final dimensions of Z-notch 110. Generally, the thickness is within the range of 0.203 centimeters (cm) (0.080 inches (in)) to 0.254 cm (0.100 in).

Figure 4:
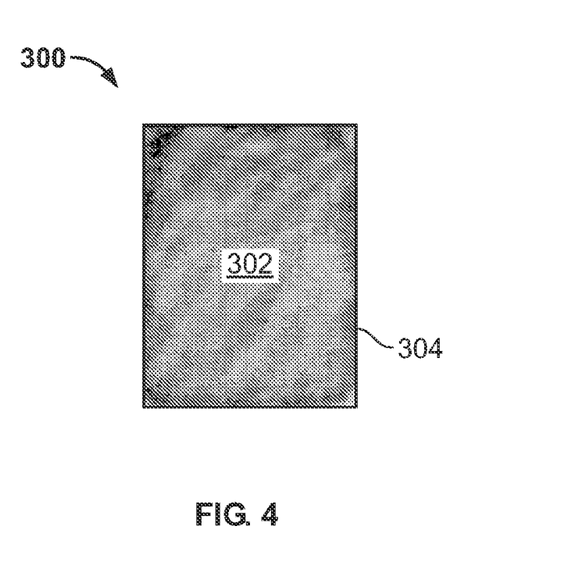
FIG. 4 is an overhead perspective view of a pre-sintered preform flat plate that may be applied to the turbine blade shrouds in FIG. 2.

Method step 208 of exemplary method 200 is forming a sintered preform. Step 208 includes a sub-step of sintering the PSP flat plate preform. Sintering the preform is performed by heating the PSP flat plate to a predetermined temperature for a predetermined period of time in a thermostatically-controlled sintering furnace in order to attain a porosity of less than 2% in the PSP. The braze and hardface powders in the hybrid hardface mixture are permitted to melt and mix, i.e., diffuse, with each other to form a substantially homogeneous mixture. Upon completion of sintering the PSP flat plate preform is allowed to cool. FIG. 4 is an overhead perspective view of a flat plate assembly 300 that includes a sintered flat plate 302 that may be applied to turbine blade shrouds Z-notches 110 (shown in FIG. 2). Sintered flat plate 302 is illustrated resting on a forming tray 304. Step 208 also has a second sub-step of extracting a sintered preform (not shown in FIG. 4) from sintered flat plate 302. The sintered preform is extracted from the sintered flat plate by using either a laser cutting tool or a water jet cutting tool. The sintered preform has predetermined dimensions substantially similar to those associated with the predetermined final dimensions for Z-notch 110.

Figure 5:
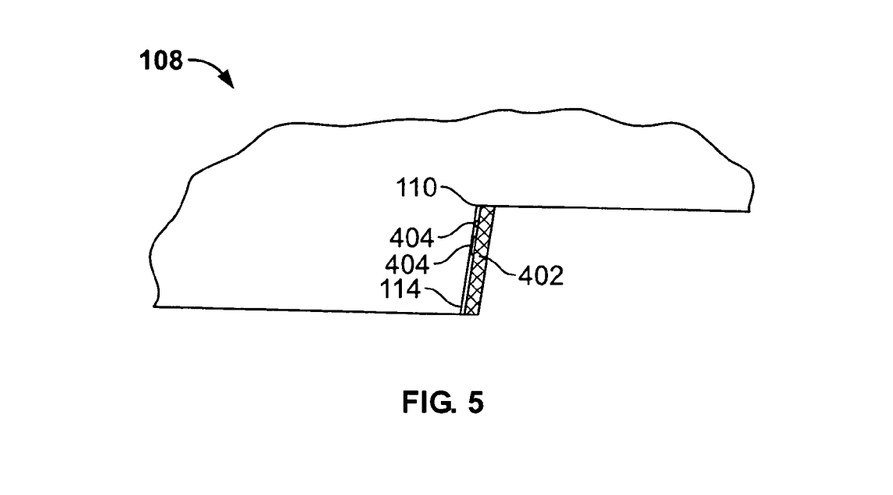
FIG. 5 is a fragmentary perspective view of a shroud in FIG. 2 with a coupled sintered hardface preform.

Method step 210 of exemplary method 200 is positioning the sintered preform on turbine blade shroud Z-notch 110. FIG. 5 is a fragmentary perspective view of shroud 108 with a coupled sintered hardface preform 402. Preform 402 is held in place on mating surface 114 of Z-notch 110 by at least one discrete tack weld 404. In the exemplary embodiment, two tack welds are used to facilitate preform 402 adherence to surface 114. Generally, the number of tack welds is held to one or two welds to mitigate formation of heat affected zones on surface 114 and to mitigate deformation of preform 402. Typically, a welding torch (not shown in FIG. 5) is sufficiently powerful to form tack welds 404 through hardface preform 402 while forming substantially only localized melting of the substrate at mating surface 114 at tack weld 404 locations.

Alternatively, as is known in the art, a layer of material with a predetermined thickness and chemical makeup may be inserted between preform 402 and surface 114 to facilitate bonding. For example, a thin foil of commercially available nickel-based alloy Amdry 915 with a chemistry of Ni 13Cr 4Si 4Fe 3B may be used. The thickness of the thin foil may be approximately 1 millimeter (mm) (0.04 inches (in)) to 5 mm (0.20 in) and the other dimensions may be substantially similar to the dimensions of surface 114.

Method step 212 of exemplary method 200 is brazing sintered preform 402 to Z-notch mating surface 114. Step 212 includes a heating cycle sub-step and a cooling cycle sub-step. The heating cycle sub-step includes at least one rate of heat addition, at least one holding temperature and at least one holding period. In the exemplary embodiment, the heating cycle sub-step includes placing shroud 108, with preform 402 tack welded to each of its two Z-notches 110, into a brazing furnace that is at room temperature, i.e., approximately 21° Celsius (C) (70° Fahrenheit (F)). To facilitate the bonding process, a non-oxidizing atmosphere within the furnace and a method of inducing a pressure on hardface preform 402 may be provided per methods well known to practitioners of the art. To obtain a non-oxidizing atmosphere, a vacuum is formed in the furnace with a pressure of approximately 0.067 Pascal (Pa) (0.5 milliTorr) or less. (The furnace is heated to approximately 650° C. (1200° F.) at a rate of approximately 14° C./minute (25° F./minute). Once approximately 650° C. (1200° F.) is attained, this temperature is maintained for approximately 30 minutes. Then the furnace temperature is increased to approximately 980° C. (1800° F.) at a rate of approximately 14° C./minute (25° F./minute). Once approximately 980° C. (1800° F.) is attained, this temperature is maintained for approximately 30 minutes. Then the furnace temperature is increased to approximately 1204 to 1218° C. (2200 to 2225° F.) at a rate of approximately 19° C./minute (35° F./minute). Once approximately 1204 to 1218° C. (2200 to 2225° F.) is attained, this temperature is maintained for approximately 20 minutes.

The cooling cycle sub-step includes at least one holding temperature and at least one holding period. In the exemplary embodiment, the cooling cycle sub-step includes a controlled cooling of the brazing furnace with shroud 108 inside to approximately 1120° C. (2050° F.) and maintaining that temperature for approximately 60 minutes. Then the furnace is further cooled to approximately 815° C. (1500° F.). The furnace is subsequently cooled to approximately room temperature.

In an alternative embodiment, step 212 may be performed in conjunction with other heat treatment activities to reduce a manufacturing schedule. For example, shrouds 108 undergoing additional or other maintenance and repair activities may also use step 212 as a method of relieving stress. Also, alternatively, heat treatment of airfoils 106 may be performed in conjunction with shrouds 108.

Step 212 of exemplary method 200 facilitates formation of a strong bond between hardface preform 402 and mating surface 114. This is at least partially due to the boron (B) concentration in the MAR M-509B brazing powder. Step 212 uses a form of diffusion bonding in which sustained yielding and creep of the surfaces of the materials being bonded at elevated temperatures facilitates removal of substantially all voids between the two materials. The boron tends to diffuse from hardface preform 402 into mating surface 114 thereby facilitating the diffusion bonding process. In general, the greater the amount of boron that has diffused through the materials and the greater the distance the stronger the bond. In the exemplary embodiment, boron diffusion facilitates a diffusion bond between 76 micrometers (μm) (0.003 inches) and 127 μm (0.005 inches) as compared to hardfacing using fusion welding methods, including tungsten inert gas (TIG), laser and plasma arc welding methods, which provide substantially no diffusion bonding. In the exemplary embodiment the shear strength, i.e., the force that a material or a bond can withstand prior to failing, of the diffusion bond is between 89,600 kilopascals (kPa) (13 kips per square inch (ksi)) at approximately 704° C. (1300° F.) and 93,800 kPa (13.6 ksi) at approximately room temperature. This range is compared to the shear strength of the substrate alone at 927° C. (1700° F.) of approximately 100,663 kPa (14.6 ksi).

Alternatively, in order to further facilitate method step 212, method step 210 may include inserting a layer of a boron-containing material between mating surface 114 and preform 402 to increase the concentration of diffused boron in the bond. Also, alternatively, the brazing powder described in method step 204 may have the boron concentration increased to facilitate the diffusion bonding process. Furthermore, alternatively, an additional boron-containing powder may be mixed with the exemplary braze and hardface powders in method step 204.

In addition to improved bonding characteristics, advantages over the aforementioned welding methods include mitigation of porosity of the hardface material. This is due to having a single consistent layer formed while welding typically has multiple layers formed in a dynamic method with inconsistent layer formation. Additional advantages include elimination of creation of heat affected zones and subsequent weld-induced cracking. A further advantage includes mitigation of oxidizing of the substrate and hardface material since a non-oxidizing environment is used to form the hardface layer.

Figure 6:
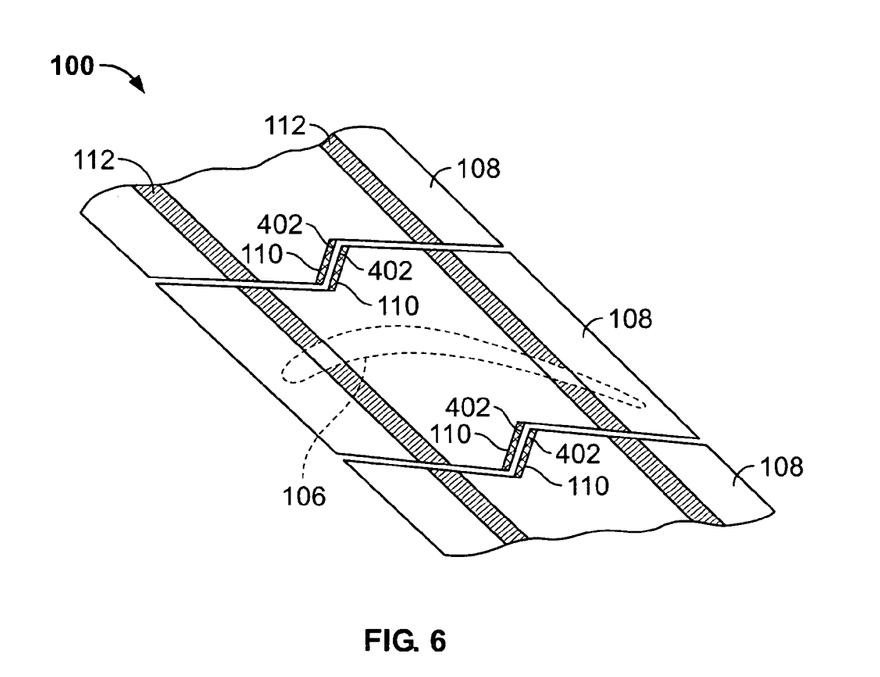
FIG. 6 is fragmentary overhead perspective view of the turbine blade shrouds with hardfacing that may be used with the combustion turbine engine in FIG. 1.

FIG. 6 is fragmentary overhead perspective view of turbine blade shrouds 108 that may be reinstalled in combustion turbine engine 100 with hardfacing 402 in Z-notches 110. Prior to reinstalling shrouds 108 into engine 100, minor machining of hardfacing 402 may be performed to mitigate surface irregularities and to facilitate hardfacing dimensioning to be substantially similar to the associated dimensions of mating surface 114.

The methods and apparatus for a fabricating a turbine blade described herein facilitates operation of a turbine system. More specifically, hardfacing the turbine blade as described above facilitates a more robust, wear-resistant and reliable turbine blade. Such blade also facilitates reliability, and reduced maintenance costs and turbine system outages.

Exemplary embodiments of turbine blades as associated with turbine systems are described above in detail. The methods, apparatus and systems are not limited to the specific embodiments described herein nor to the specific illustrated turbine blades.

While the invention has been described in terms of various specific embodiments, those skilled in the art will recognize that the invention can be practiced with modification within the spirit and scope of the claims.

What is claimed is:

1. A method of fabricating a machine component comprising:
   preparing at least a portion of a surface of the machine component for receiving a sintered preform such that metallurgical impurities are removed from the portion of the surface;
   forming a pre-sintered preform hybrid hardface mixture comprising combining a predetermined portion of at least one hardfacing material with a predetermined portion of at least one brazing material;
   forming a pre-sintered preform, the pre-sintered preform having a predetermined thickness;
   forming a sintered preform having a porosity of less than 2% and based at least on dimensions of the machine component;
   inserting a layer of material containing boron between the sintered preform and the machine component to facilitate a diffusion bond between the sintered preform and the machine component;
   positioning the sintered preform on the machine component; and
   fixedly coupling the sintered preform to at least a portion of the machine component via brazing, such that a diffusion bond is formed between the sintered preform and the machine component, wherein to fixedly couple the sintered preform, the machine component and the sintered preform is heated from room temperature to approximately 1200° F. at a rate of heat addition of approximately 25° F. per minute, and the machine component and the sintered preform are then heated at a holding temperature of approximately 1200° F. for a holding period of approximately 30 minutes.

2. A method of fabricating a machine component in accordance with claim 1 wherein preparing at least a portion of a surface comprises removing loose surface contaminants, applied coating materials, and surface irregularities from at least a portion of the surface of the machine component.

3. A method of fabricating a machine component in accordance with claim 1 wherein forming a pre-sintered preform comprises forming the pre-sintered preform mixture in a shape substantially similar to a flat plate.

4. A method of fabricating a machine component in accordance with claim 1 wherein forming a sintered preform comprises:
   forming a sintered flat plate by sintering the pre-sintered preform via heating to a predetermined temperature for a predetermined time, the pre-sintered preform having a shape substantially similar to a flat plate with a predetermined thickness; and
   extracting a sintered preform from the sintered flat plate, the sintered preform having predetermined dimensions.

5. A method of fabricating a machine component in accordance with claim 1 wherein positioning the sintered preform comprises tack welding at least a portion of the sintered preform to at least a portion of the surface of the machine component.

6. A method of fabricating a machine component in accordance with claim 1 wherein fixedly coupling the sintered preform comprises heat treating the machine component and the sintered preform, said heat treating comprising a heating cycle and a cooling cycle, the heating cycle having at least one rate of heat addition, at least one holding temperature and at least one holding period, the cooling cycle having at least one holding temperature and at least one holding period.

7. A method of fabricating a machine component in accordance with claim 1, wherein said forming a pre-sintered preform hybrid hardface mixture further comprises combining a portion of at least one hardfacing material between approximately 90% by weight and approximately 60% by weight with a portion of at least one brazing material between approximately 10% by weight and approximately 40% by weight.

8. A method of fabricating a machine component in accordance with claim 1, wherein said forming a pre-sintered preform hybrid hardface mixture further comprises combining a portion of at least one hardfacing material between approximately 80% by weight and approximately 85% by weight with a portion of at least one brazing material between approximately 20% by weight and approximately 15% by weight.

9. A method of fabricating a machine component in accordance with claim 1, wherein said fixedly coupling the sintered preform further comprises:
   heating the machine component and the sintered preform from approximately 1200° F. to approximately 1800° F. at a rate of heat addition of approximately 25° F. per minute; and
   heating the machine component and the sintered preform at a holding temperature of approximately 1800° F. for a holding period of approximately 30 minutes.

10. A method of fabricating a machine component in accordance with claim 9, wherein said fixedly coupling the sintered preform further comprises:
    heating the machine component and the sintered preform from approximately 1800° F. to between approximately 2200° F. and approximately 2255° F. at a rate of heat addition of approximately 35° F. per minute; and
    heating the machine component and the sintered preform at a holding temperature of between approximately 2200° F. and approximately 2255° F. for a holding period of approximately 20 minutes.

11. A method of fabricating a machine component in accordance with claim 10, wherein said fixedly coupling the sintered preform further comprises:
    reducing the heat of the machine component to approximately 2050° F.; and
    maintaining a holding temperature of approximately 2050° F. for a holding period of approximately 60 minutes.

* * * * *